No. 888,590. PATENTED MAY 26, 1908.
E. J. COUGHLIN.
HOSE.
APPLICATION FILED MAR. 24, 1906.
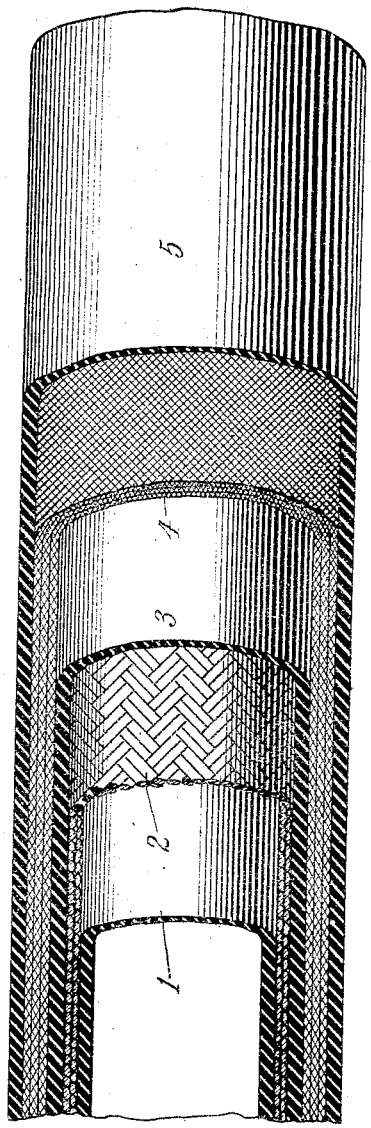

UNITED STATES PATENT OFFICE.

EDWARD J. COUGHLIN, OF PASSAIC, NEW JERSEY, ASSIGNOR TO THE NEW YORK BELTING & PACKING COMPANY, LIMITED, A CORPORATION OF GREAT BRITAIN.

HOSE.

No. 888,590.

Specification of Letters Patent.

Patented May 26, 1908.

Application filed March 24, 1906. Serial No. 307,780.

*To all whom it may concern:*

Be it known that I, EDWARD J. COUGHLIN, a citizen of the United States, residing in Passaic, county of Passaic, and State of New Jersey, have invented a new and useful Improvement in Hose, of which the following is a specification.

This invention relates to hose, and more particularly to hose for the transmission of steam and other heated fluids, and it has for its principal object the provision of a hose for the purposes mentioned which is characterized by great durability and strength and is not liable to develop leaks in service, even when subjected to unusually high degrees of heat.

The object above mentioned and others which will hereinafter appear are attained in the hose illustrated in the accompanying drawing and hereinafter described and claimed.

In the drawing, a single dissected view, partly in elevation, and partly in section, shows the entire structure of the improved hose.

Referring to the drawing by the reference characters marked thereon, 1 designates the lining of the hose, which should be of a rubber compound adapted to withstand a high temperature and also characterized by a high degree of flexibility. This lining is formed upon a mandrel in any suitable manner, and over it a jacket 2 of asbestos is formed. This jacket 2 is preferably made by a braiding process by which it is formed directly upon the tubular lining 1 while it is in position upon the mandrel, a close union of the strands of asbestos and the tubular lining 1 being thus obtained. The jacket 2 of asbestos is seamless, and fits as snugly as possible around the lining 1 so as to coöperate effectively therewith in resisting internal pressure. Surrounding the seamless jacket 2 of asbestos is placed a layer 3 of rubber compound, which is brought into close association with the asbestos jacket and is formed in any suitable manner directly over the asbestos jacket. Surrounding the layer 3 of rubber which envelops the asbestos jacket 2, there is placed a strengthening sheath 4 of duck or other textile material, preferably cut on the bias, as shown, and wound around the layer 3 of rubber to form a wrapping presenting a sufficient number of plies to afford the degree of strength required to resist the internal strains and also to effectively protect the inner layers from injury from external agents. The sheath 4 is preferably completely covered by an outer envelop or jacket 5 of rubber, but this outer jacket 5 may be made of any one of a number of materials without departing from the spirit of the invention or it may, if desired, be omitted.

The hose constructed in the manner above described is especially serviceable, the asbestos jacket which surrounds the tubular lining contributing both strength and heat-resisting qualities to the hose. The seamless construction of the asbestos jacket 2 not only renders it stronger than a jacket formed from a strip of asbestos cloth, but insures better union of the asbestos jacket with the lining of the hose, and it also insures the protection of the layer 3 of rubber and the sheath 4 of textile material from injurious effects from the heat of the steam or other fluid transmitted through the hose. The outer covering 5 of rubber serves its usual function of protecting the sheath 4 from mechanical injury and from the deteriorating effects of air and moisture.

The hose above described, while of simple, compact, and comparatively light construction, is adapted to withstand the effects of steam or other fluids at high temperature and correspondingly high pressure, and is particularly suitable for use upon railway trains, where the hose is subjected to most severe tests.

The invention having been thus described, what I claim as new is:

A hose structure comprising an inner tubular lining of vulcanized rubber compound, a seamless braided jacket of asbestos threads surrounding said lining and in contact therewith, a layer of vulcanized rubber compound covering said jacket, and a strengthening and protective covering of textile fabric wound around said covering layer of rubber compound.

In testimony whereof, I have signed my name in the presence of two witnesses.

EDWARD J. COUGHLIN.

Witnesses:
H. RICHARD WÖBSE,
BAXTER MORTON.